Aug. 31, 1954

J. A. KANUCH 2,687,869

FLOW RESTRICTOR VALVE

Filed April 6, 1950

Inventor:
John A. Kanuch
By: [signature]
Atty.

Patented Aug. 31, 1954

2,687,869

UNITED STATES PATENT OFFICE 2,687,869

FLOW RESTRICTOR VALVE

John A. Kanuch, South Euclid, Ohio, assignor to Borg-Warner Corporation, Chicago, Ill., a corporation of Illinois Application April 6, 1950, Serial No. 154,220

10 Claims. (Cl. 251—30)

This invention relates to a hydraulic power control system, and more particularly to a flow restrictor valve for use in such a system.

In the operation of heavy, hydraulically actuated apparatus, as for example, in operating a hydraulically raised or lowered plow or other similar equipment wherein hydraulic pressure is employed to move the device in one direction against gravity while return of the device, that is, lowering, is effected by gravity upon the hydraulic pressure being removed, it is sometimes the practice to provide a three-way valve whereby in one position of the valve, pressure may be applied to actuate the hydraulic mechanism, in a second or neutral position of the valve the actuating pressure is maintained, and in a third position of the valve return flow is permitted to allow lowering of the hydraulic mechanism by gravity.

In my earlier-filed application, Ser. No. 126,873, filed November 12, 1949, now U. S. Patent No. 2,607,599, a three-way valve is shown and described including means for controlling the rate of return flow, that is, for modulating or metering the return flow whereby the rate of lowering the device may be closely controlled. It has been found, however, that with wide variations in the weight of the load, it is difficult, particularly for an unskilled operator, to closely control the rate of lowering of the load. Thus, with an extremely heavy load, the load may be lowered so fast as to be damaged, whereas with a very light load, lowering may be too slow.

An object of the present invention is to provide a simple and efficient flow restrictor valve for metering return flow to provide a uniform rate of return flow regardless of pressure or load.

A further object of the present invention is to provide a flow restrictor valve which may be operated by a solenoid.

In accordance with one embodiment of this invention, a flow restrictor valve may comprise a primary valve arranged to be held seated by a combination of fluid and spring pressure until actuation of a solenoid associated with the valve whereby the fluid pressure on one side of the valve is dumped causing the primary valve to shift rapidly to open position, and a secondary or flow restricting valve associated with the primary valve and arranged to permit a fluid flow metered in inverse proportion to pressure so that a uniform flow rate is established.

Figure 1:
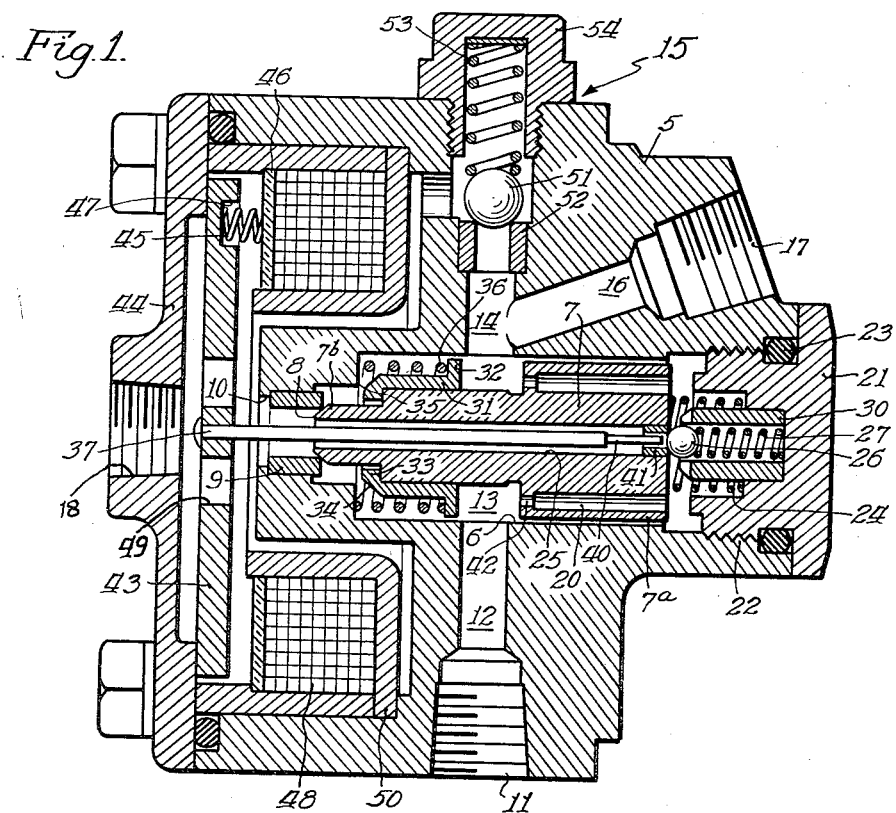
Figure 2:
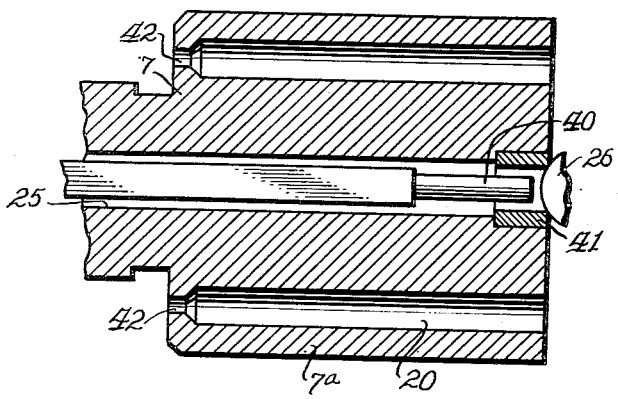

Other objects and advantages of the present invention will be apparent from the following detailed description thereof taken in conjunction with the drawings wherein:

Fig. 1 is an axial sectional view of a flow restrictor valve constructed in accordance with one embodiment of this invention, and Fig. 2 is a considerably enlarged detail view of the poppet valve shown in Fig. 1 and associated parts.

Referring now to the drawings, it will be seen that this valve comprises a valve housing or valve block 5 provided with a plurality of chambers and passages to accommodate the several valving mechanisms of the flow restrictor valve. A valve chamber 6 is formed substantially in the center of the valve housing 5 and extends transversely, as viewed in this drawing. In this chamber 6 is journalled an axially shiftable, elongated control valve 7 having a truncated, conical tip 8 at its left end adapted to seat on the right end of a sleeve-shaped valve seat insert 9 mounted in a throat 10 provided at the left end of valve chamber 6.

Pressure is admitted to the valve chamber 6 through a port 11 provided at the lower side thereof and communicating with an upwardly extending passage 12, the upper end of which opens into the lower side of the chamber 6. Valve 7 is made substantially less in diameter than the chamber 6 in this area and, consequently, there is provided an annular chamber or passage 13 about the periphery of the valve 7, which chamber 13 communicates at its upper end with an extension 14 of passage 12. The upper end of passage 14 communicates with a relief valve designated generally at 15 and described in detail hereinafter. A passage 16 branches to the right from passage 14 and connects at its right end to a port 17 which may be connected to a suitable hydraulic pressure utilization device. Pressure supplied to the flow restrictor valve through the port 11 is thus communicated through the passages 12, 13, 14 and 16 to the port 17 and to the device to be controlled substantially unimpeded by the flow restrictor valve.

This flow restrictor valve is intended for use only in metering return pressure when the line connected to the port 11 would normally be closed as, for example, where the line connected to the port 11 is connected at its other end to a three-way valve of the type shown in my aforementioned earlier-filed patent application whereby pressure may be applied to the device to be actuated at a controlled rate and the pressure held for neutral position and finally the return pressure controlled for lowering the load. The present invention provides an alternative mechanism for permitting lowering of the load which facilitates control of the rate of lowering.

Considering then the port 11 as closed, as for example, by closing the control valve associated with the line connected to the port 11, return pressure from the hydraulic device will pass through port 17, passage 16, passage 14 and enter the valve chamber 6. Pressure entering valve chamber 6 is exerted against the left side of an enlarged valve stem portion 7-a provided at the right of valve 7 and is also exerted against the right end of the valve 7 by virtue of a pair of axially extending passages 20 formed in the valve portion 7-a and communicating at their left ends with the annular chamber or passage 13 and at their right ends with the right end of valve chamber 6. The right end of valve chamber 6 is closed by a retainer cap 21 threaded into an enlarged portion 22 provided at the right end of chamber 6, seal ring 23 being disposed between the periphery of retainer cap 21 and the inner wall of enlarged portion 22 of valve chamber 6 to prevent escape of fluid pressure. The retainer cap 21 serves also as a stop or support for the right end of a helically coiled spring 24, the left end of which spring bears against the right end of valve 7, urging valve 7 to the left into seating relation with valve seat 9.

While valve 7 is provided with an axially extending passage 25, this passage is normally closed by a ball poppet valve 26 which is held against a bushing 41 located in the right end of passage 25 by a short spring 27, the right end of which bears against the inner side of retainer cap 21 and the left end of which bears against the right side of the poppet ball. Guide sleeve 30 carried by the retainer cap 21 and extending axially to the left therefrom serves to maintain proper alignment of the poppet ball 26 and spring 27 with respect to the right end of the axially extending aperture 25.

Pressure communicated to chamber 6 also is exerted against a sleeve-shaped flow restrictor valve member 31 disposed about the left portion of valve 7, said flow restrictor valve operating independently of and in series, or tandem, with the valve 7 to control flow to said valve 7 and through said valve assembly. This valve member 31 is of generally sleeve-like configuration but is provided with an outwardly extending flange 32 at its right end and an inwardly extending flange 33 at its left end, the outwardly extending flange 32 being of but very slightly less diameter than the inner diameter of the valve chamber 6 in this area. Inwardly extending flange 33 encircles the right end of a reduced left portion 7-b of the valve 7, which reduced left portion 7-b terminates in the truncated valving surface 8. The outer portion of left flange 33 is beveled as indicated at 34 to define a valving surface which cooperates with a sharp edge or rim 35 formed by reducing abruptly the diameter of chamber 6 at this point to define a second valve seat. A sharply edged seat is particularly desired so that variations in fluid viscosity will not materially affect the flow rate.

The sleeve valve 31 is normally held at its extreme right position, that is, with the right inner end of flange 33 bearing against the left end of the mid or intermediate portion of valve 7 by a helically coiled spring 36 encircling the valve 31 and having its left end bearing against the left end wall of the main portion of chamber 6, while the right end of spring 36 bears against the left side of flange 32 of valve 31.

Under a static condition, that is, with the poppet ball valve 26 seated, because the total area of valve 7 exposed to return pressure and facing in the direction of establishing a seat exceeds the total area exposed to return pressure tending to open the valve, the valve is held seated under hydraulic pressure. The seating tendency of the valve is also aided by the springs 24 and 27. In an actual embodiment spring 24 is selected to exert a pressure of approximately 3 lbs. and spring 27 a pressure of approximately ½ lb.; it will therefore be apparent that there is a spring provided seating force of approximately 3½ lbs. under these conditions.

In order to permit opening of the flow restrictor valve to permit return flow and at the same time to facilitate control of the opening of this valve from a remote point, a solenoid actuated push rod 37 is employed to push the poppet valve 26 off its seat. The push rod 37 is preferably made of square stock and is received in the cylindrical passage 25, which extends axially through the valve 7, being slidably journalled therein and provided at its right end with a reduced diameter tip portion 40 which extends into the axially apertured bushing 41, located in the right end of the passage 25. Bushing 41 does not provide a bearing support for the push rod 37 which is maintained in axial alignment by the sliding contact of its squared edges with the inner wall of passage 25, but only provides at its right end a seat for poppet ball valve 26. The bushing 41 thus constitutes a convenient means of providing a seat for the poppet valve but may be omitted by selecting the size of the poppet valve 26 with reference to the size of the passage 25 so that the end of the passage 25 can be made to serve as the valve seat. Also, it will be apparent that the right end of passage 25 can be reduced in diameter to provide much the same function as that provided by the bushing 41.

In an actual embodiment, the pin portion 40 of the push rod 37 may be selected to have a diameter of approximately .06 of an inch. In such embodiment the aperture through the bushing 41 is selected to have a diameter of .11 of an inch. It will be apparent therefore, that there is a difference in area of .0056 square inch, providing thereby an effective passage of annular configuration of .0056 square inch when the ball poppet valve 26 is not seated.

By moving the push rod 37 to the right, the ball poppet valve 26 may be raised from its seat. Opening valve 26 will cause an immediate drop in the pressure effective against the right end of valve 7, while the system return pressure against the left side of enlarged portion 7-a will tend to remain at a higher level. More specifically, opening poppet valve 26 permits pressure in the chamber at the right end of valve 7 to escape through the axial passage 25 in the valve, the squared cross-section of push rod 37 providing sufficient clearance between the push rod and the wall of the passage 25. Passage 25 communicates with the outlet port 18 of the flow restrictor valve at all times. Thus, it will be evident that opening poppet valve 26 causes a sudden drop in the pressure effective against the right end of valve 7 and the higher pressure against the left side of valve portion 7-a is then effective to shift the valve 7 to the right. The open position of valve 7 will then be maintained due to the fact that the axially extending apertures 20 formed in the enlarged portion 7-a of valve 7 are provided with very restricted orifices 42 at their left ends having a total effective area approximately one-half that of the annular passage provided between the tip 40 of the push rod 37 and the bushing interior wall 41 and, thus, the pressure effective against the left side of valve portion 7-a exceeds substantially the pressure effective against the right end, since the orifices 42 cause a substantial pressure drop. In the actual embodiment referred to in connection with the figures mentioned above for the push rod tip and the bushing 41, the orifices 42 were selected to have a diameter of .046 inch, thus providing a combined passage area of .0031 square inch.

In order to move push rod 37 to the right, the left end of push rod 37 is secured to the center of a large plate 43 made of a magnetizable material, such as iron. Plate 43 is normally urged to the left against a cover plate 44, bolted to the left side of valve housing 5, by a plurality of springs 45, the left ends of which bear against the right side of the plate 43 and the right ends of which bear against the left end of a solenoid coil end retaining plate 46. Short cylindrical recesses 47 are provided in the right side of plate 43 and are spaced circumferentially thereabout to receive the left ends of spring 45. A solenoid coil 48 is mounted within the valve housing 5, coaxially of chamber 6, being supported therein so that its left end is closely adjacent plate 43, by a mounting plate 50 suitably secured within the valve housing. By energizing coil 48, the plate 43, to which the left end of push rod 37 is secured, may be caused to move to the right and thereby the poppet valve 26 moved off its seat. Since the control of the actuation of solenoid coil 48 is entirely electrical, a suitable control switch (not shown) may be located at any convenient point.

Upon energizing coil 48 and moving push rod 37 to the right to unseat poppet ball valve 26, and thereby to unseat valve 7, an exhaust passage is provided from the left end of the valve chamber 6 through the throat 10 to the outlet port 19 formed in the cover plate 44, the magnetizable plate 43 to which push rod 37 is affixed being provided with a plurality of radially disposed, axially extending apertures 49 to permit passage of fluid therethrough.

While some fluid will pass to the right through the restricted orifices 42, the axially extending passages 20, and the axially extending passage 25 in the valve 7 to the return port 18, the primary pressure return path is to the left over the periphery of sleeve valve 31, normally held off its seat 35 by spring 36, through the open valve 7 and to the port 18. The sleeve valve 31 will respond to an increase in return pressure by tending to move to the left to close the passage, thus restricting fluid flow, and the extent of movement of this flow restrictor valve member will be determined by the size of the spring 36 as well as the size of the annular orifice provided about the periphery of flange 32 and the inner adjacent wall of chamber 6 and the exposed right end surface of flange 32. It will be apparent that a pressure drop will occur at this orifice whereby the pressure on the left side of flange 32 is substantially reduced as compared to the pressure on the right side. This pressure drop tends to move the sleeve valve 31 to the left to closed position against spring 36. At the same time, pressure being exerted against the left end of enlarged valve portion 7-a will tend to move the valve 7 to the right, by virtue of the pressure drop caused by the restricted orifices 42. Moving valve 7 to the right increases the opening at the valving end thereof, thereby increasing the flow permitted of the fluid which passes the flow restrictor valve 31. In other words, an increase in return pressure reduces the effective pressure at the return port and particularly at the orifice defined by the valve seat 9 and at the same time tends to move the flow restrictor valve 31 to a further closed position. By a proper proportioning of the various orifices and pressure responsive surfaces, it will be apparent that a close control of flow rate may be maintained regardless of return pressure.

To prevent return pressure from exceeding a predetermined desired maximum, this flow restrictor valve incorporates the relief valve 15, which comprises simply a ball poppet valve 51 arranged to seat on a sleeve valve insert 52 mounted at the upper end of passage 14, and the ball poppet valve is normally held seated by a spring 53 which is, in turn, held in position by a retainer cap 54 threaded in the upper side of the housing 5. By a suitable selection of the compression value of spring 53, any desired relief setting may be obtained.

From the foregoing, it will be apparent that in accordance with this invention there is provided a very simple and efficient flow restrictor valve which may be readily controlled from a remote point by a switch in an electrical circuit for the solenoid coil 48. In the particular use for which the valve shown is intended, the valve is used as an alternative return flow control means in conjunction with the three-way valve described in my aforementioned earlier-filed patent application. When it is desired to lower a load, the operator merely closes the switch of the solenoid circuit, thereby energizing the coil 48 to move push rod 37 to the right to unseat poppet ball valve 26. The return flow is then metered in accordance with the setting of the flow restrictor valve, regardless of the system pressure. In most cases it is sufficient to merely change the spring 36 for a heavier or a lighter spring in order to increase or to reduce the rate of metered return flow. It will be obvious this is a very simple operation. It is also feasible, however, to substitute a flow restrictor valve member having a different diameter flange 32 to obtain a different return flow rate characteristic.

While this invention has been described primarily as a return pressure flow restrictor valve, it will be evident that the valve is readily adapted to controlling the flow rate from a pressure source, such as a gear pump, merely by sealing one of the ports 11 or 17 and connecting the pressure source to the other of these two ports. Metered pressure would then be taken off from the port 18 and within a wide range of pressure values, this flow restrictor valve would be effective to deliver a uniform flow rate despite variations in supply pressure. By deenergizing coil 48, the valve is instantly closed, the seating pressure being in proportion to the applied pressure. At such time as metered flow is desired, the coil 48 is energized, the valve 7 shifts to the right to open position, and the flow restrictor valve is then effective to control the rate of flow.

Where herein the various parts of this invention have been referred to as being located in a right or a left position, or an upper or a lower position, it will be understood that this is done solely for the purpose of facilitating description and that such references relate only to the relative positions of the parts as shown in the accompanying drawings.

While but one embodiment of this invention has been shown and described, it will be understood that many changes and modifications may be made therein without departing from the spirit or scope of the invention.

I claim:

1. In a flow restrictor valve, a housing having inlet and outlet ports formed therein, a first valve journalled in said housing intermediate said inlet and outlet ports and axially shiftable with respect to said housing, means for normally urging said first valve closed, a second valve disposed coaxially of said first valve intermediate said inlet and outlet ports and arranged continuously to control the flow supplied to said first valve from said inlet port, means for urging said second valve normally open, a pressure responsive surface on said first valve arranged in response to application of pressure thereto from said inlet port to tend to cause opening of said first valve, a pressure responsive surface on said second valve arranged in response to application of pressure thereto from said inlet port to tend to cause closing of said second valve, said two surfaces being oppositely disposed and arranged to define opposed end walls of a pressure chamber whereby pressure may be applied to said first surface to cause movement of said first valve toward opened position and to said second surface to restrict the flow supplied to said first valve.

2. In a flow restrictor valve assembly, a valve housing, a first valve journalled in said housing and having a valving surface at one end thereof, a first pressure responsive surface at the opposite end thereof responsive to applied pressure to tend to hold said valving surface seated, a second oppositely disposed pressure responsive surface exposed directly to the pressure to be metered by said valve, restricted means for applying pressure to said first pressure responsive surface from said second surface, means for venting pressure applied to said first surface to cause opening of said valve to establish flow of pressure through said valve, a second valve disposed in said housing and located so as to continuously control the flow of pressure through said first valve during the entire period said first valve is open, said second valve being independently movable with respect to said first valve and having a pair of oppositely disposed pressure responsive surfaces thereon, and means for applying a differential pressure to said last mentioned surfaces at all times whereby said second valve tends to close as applied pressure tends to increase.

3. A flow restrictor valve assembly including a housing having an inlet port, an outlet port, and a valve chamber between said inlet and outlet ports, a valve seat at one end of said chamber, valving means axially shiftable in said chamber and arranged to seat at one end on said valve seat to control fluid flow through said valve, said valving means having a first surface thereon intermediate the ends thereof exposed to inlet pressure and arranged to urge said valving means to unseated position in response to inlet pressure, a relatively larger, oppositely directed, second surface at the other end of said valving means, restricted passage defining means for communicating inlet pressure to said second surface to urge said valving means toward seated position, venting means effective when opened to bleed pressure from said second surface more rapidly than pressure is supplied thereto whereby the pressure on said second surface may be made substantially less than the pressure on said first surface, an annular restrictor valve disposed on said valving means intermediate the inlet port and the outlet port, resilient means, normally urging said restrictor valve to open position, a valve seat cooperating with said restrictor valve in said housing, and a pressure responsive surface on said restrictor valve exposed to inlet pressure applied to said valve through said inlet port so as to tend to cause said restrictor valve to seat in response to inlet pressure whereas said valving means when said venting means is opened tends to open.

4. A flow restrictor valve assembly including a housing having an inlet, an outlet, and a valve chamber between said inlet and said outlet, a valve seat at one end of said chamber, an axially shiftable control valve journalled in said chamber and arranged to seat at one end on said valve seat to control fluid flow through said valve, said valve having a first surface thereon intermediate the ends thereof exposed directly to inlet pressure and responsive to inlet pressure to urge said valve away from said seat, a second, relatively larger, oppositely directed, surface at the other end of said valve, restricted passage defining means for communicating inlet pressure to said second surface whereby said valve is urged toward said seat, venting means effective when opened to bleed pressure from said second surface more rapidly than pressure is supplied thereto, whereby the pressure on said second surface may be made substantially less than the pressure on said first surface, an annular restrictor valve disposed on said control valve intermediate the inlet port and the outlet port, resilient means normally urging said restrictor valve to open position, a valve seat cooperating with said restrictor valve in said housing, and a pressure responsive surface on said restrictor valve exposed to inlet pressure applied to said valve through said inlet port so as to tend to cause said restrictor valve to seat in response to inlet pressure whereas said valving means, when said venting means is opened, tends to open.

5. A flow restrictor valve assembly including a housing having an inlet, an outlet, and a valve chamber between said inlet and said outlet, a valve seat at one end of said chamber, an axially shiftable control valve journalled in said chamber and arranged to seat at one end on said valve seat to control fluid flow through said valve, said valve having a first surface thereon intermediate the ends thereof exposed to inlet pressure and responsive to inlet pressure to urge said valve away from said seat, a second, relatively larger, oppositely directed, surface at the other end of said valve, restricted passage defining means for communicating inlet pressure to said second surface whereby said valve is urged toward said seat, said valve having an axially extending vent passage formed therethrough communicating at the end adjacent said seat with said outlet and at its opposite end with said second surface, a poppet valve arranged to seat on said latter end of said passage, means for unseating said poppet valve to bleed pressure from said second surface, said vent passage being effective when open to bleed pressure more rapidly from than pressure is supplied to said second surface whereby the pressure on said second surface may be made substantially less than the pressure on said first surface, an annular restrictor valve disposed on said control valve intermediate the inlet port and the outlet port, means normally urging said restrictor valve to open position, a cooperating valve seat in said housing, and a pressure responsive surface on said restrictor valve exposed to inlet pressure applied to said valve through said inlet port so as to tend to cause said restrictor valve to seat in response to inlet pressure whereas said control valve, when said poppet valve is unseated, tends to open.

6. A flow restrictor valve assembly including a housing having an inlet, an outlet, and a valve chamber between said inlet and said outlet, a valve seat at one end of said chamber, an axially shiftable control valve journalled in said chamber and arranged to seat at one end on said valve seat to control fluid flow through said valve, said valve having a first surface thereon intermediate the ends thereof exposed directly to inlet pressure and responsive to inlet pressure to urge said valve away from said seat, a second, relatively larger, oppositely directed surface at the other end of said valve, restricted passage defining means for communicating inlet pressure to said second surface whereby said valve is urged toward said seat, said valve having an axially extending vent passage formed therethrough communicating at the end adjacent said seat with said outlet and at its opposite end with said second surface, a poppet valve arranged to seat on said latter end of said passage, a push rod loosely journalled in said vent passage, solenoid associated with said push rod and effective when energized to move said push rod to unseat said poppet valve to bleed pressure through said vent passage from said second surface, said vent passage being effective when open to bleed pressure more rapidly from said second surface than pressure is supplied to said second surface whereby the pressure on said second surface may be made substantially less than the pressure on said first surface, an annular restrictor valve disposed on said control valve intermediate the inlet port and the outlet port, means normally urging said restrictor valve to open position, a cooperating valve seat in said housing, and a pressure responsive surface on said restrictor valve exposed to inlet pressure applied to said valve through said inlet port so as to tend to cause said restrictor valve to seat in response to inlet pressure, whereas said control valve, when said poppet valve is unseated, tends to open.

7. A flow restrictor valve assembly including a housing having an inlet, an outlet, and a valve chamber between said inlet and said outlet, a valve seat at one end of said chamber, an axially shiftable control valve journalled in said chamber and arranged to seat at one end on said valve seat to control fluid flow through said valve, said valve having a first surface thereon intermediate the ends thereof exposed directly to inlet pressure and responsive to inlet pressure to urge said valve away from said seat, a second, relatively larger, oppositely directed surface at the other end of said valve, restricted passage-defining means for communicating inlet pressure to said second surface whereby said valve is urged toward said seat, said valve having an axially extending vent passage formed therethrough communicating at the end adjacent said seat with said outlet and at its opposite end with said second surface, a poppet valve arranged to seat on said latter end of said passage, means for unseating said poppet valve to bleed pressure from said second surface, said vent passage being effective when open to bleed more rapidly from said second surface than pressure is supplied to said second surface whereby the pressure on said second surface may be made substantially less than the pressure on said first surface, an annular restrictor valve disposed on said control valve intermediate the inlet port and the outlet port, a cooperating valve seat in said housing, resilient means associated with said restrictor valve for urging said restrictor valve away from said seat, said restrictor valve having a motive surface at one end thereof exposed to inlet pressure whereby said restrictor valve tends to seat in response to inlet pressure whereas said valving means, when said venting passage is open, tends to open.

8. A flow restrictor valve assembly including a housing having an inlet, an outlet, and a valve chamber between said inlet and said outlet, a valve seat at one end of said chamber, an axially shiftable control valve journalled in said chamber and arranged to seat at one end on said valve seat, said valve having a first surface thereon intermediate the ends thereof exposed directly to inlet pressure and responsive to inlet pressure to urge said valve away from said seat, a second, relatively larger, oppositely directed, surface at the other end of said valve, restricted passage defining means for communicating inlet pressure to said second surface whereby said valve is urged toward said seat, said valve having an axially extending vent passage formed therethrough communicating at the end adjacent said seat with said outlet and at its opposite end with said second surface, a poppet valve arranged to seat on said latter end of said passage, a push rod loosely journalled in said vent passage, a solenoid associated with said push rod and effective when energized to move said push rod to unseat said poppet valve to bleed pressure through said vent passage from said second surface, said vent passage being effective, when open, to bleed pressure more rapidly from said second surface than pressure is supplied to said second surface whereby the pressure on said second surface may be made substantially less than the pressure on said first surface, an annular restrictor valve disposed about said valving means intermediate the inlet port and the outlet port and having formed thereon a flange portion, the periphery of which defines with the adjacent inner wall of said valve chamber a restricted annular passage whereby the pressure on the opposite side of said flange from said inlet port is reduced as compared with the inlet port pressure, said restrictor valve being arranged in tandem with said control valve to control the flow to said control valve and tending to close in response to an increase in inlet pressure and means for unseating said annular restrictor valve.

9. A flow restrictor valve assembly including a housing having an inlet, an outlet, and a valve chamber between said inlet and said outlet, a valve seat at one end of said chamber, an axially shiftable control valve journalled in said chamber and arranged to seat at one end on said valve seat, said valve having a first surface thereon intermediate the ends thereof exposed directly to inlet pressure and responsive to inlet pressure to urge said valve away from said seat, a second, relatively larger, oppositely directed surface at the other end of said valve, restricted passage defining means for communicating inlet pressure to said second surface whereby said valve is urged toward said seat, venting means effective when actuated to bleed pressure from said second surface more rapidly than pressure is supplied thereto, whereby the pressure on said second surface may be made substantially less than the pressure on said first surface, an annular restrictor valve disposed about said valving means intermediate the inlet port and the outlet port and having formed thereon a flange portion, the periphery of which defines with the adjacent inner wall of said valve chamber a restricted annular passage whereby the pressure on the opposite side of said flange from said inlet port is reduced as compared with the inlet port pressure, said restrictor valve being arranged in tandem with said control valve, said restrictor valve tending to close in response to increase in inlet pressure and resilient means for urging said annular restrictor valve toward open position.

10. In a flow restrictor valve, a shiftable valve member, a valve seat for said valve member, means for urging said valve toward seated position, a second shiftable valve member disposed axially of said valve member, a valve seat for said second shiftable valve member spaced from said first valve seat, means for urging said shiftable valve member toward open position, said flow restrictor valve having an inlet port opening and a discharge port opening, said valve members being located therebetween, and means including surfaces on said first and second valve members defining a pressure chamber having two opposed side walls, each of which surfaces being independently movable with respect to each other, means for overcoming the means for urging said first valve member toward its seat to open said valve and to establish pressure flow from said chamber and whereby said flow acts to move said second valve surface independently of said first valve member to restrict said flow through said open valve.

References Cited in the file of this patent

UNITED STATES PATENTS

| Number | Name | Date |
|---|---|---|
| 1,074,379 | Pasman | Sept. 30, 1913 |
| 1,494,708 | Reznicek | May 26, 1924 |
| 1,793,252 | Roth | Feb. 17, 1931 |
| 2,037,540 | Rohlin et al. | Apr. 14, 1936 |
| 2,107,673 | Lovekin | Feb. 8, 1938 |
| 2,167,399 | Wagner | July 25, 1939 |
| 2,472,787 | Brown et al. | June 14, 1949 |